United States Patent [19]
Amick

[11] Patent Number: 6,088,437
[45] Date of Patent: Jul. 11, 2000

[54] CALL PROCESSING SYSTEM, METHOD AND COMPUTER PROGRAM PRODUCT

[75] Inventor: John Kenneth Amick, Coconut Creek, Fla.

[73] Assignee: Touch Tone Technologies Inc., Boca Raton, Fla.

[21] Appl. No.: 09/266,724

[22] Filed: Mar. 12, 1999

Related U.S. Application Data

[60] Provisional application No. 60/082,730, Apr. 23, 1998.

[51] Int. Cl.$^7$ ...................................................... H04M 3/42
[52] U.S. Cl. .......................... 379/212; 379/229; 379/350
[58] Field of Search ................................... 379/211, 212, 379/220, 1, 2, 3, 377, 350, 361, 207, 219, 221, 229, 230, 231

[56] References Cited

U.S. PATENT DOCUMENTS

| | | | |
|---|---|---|---|
| 4,667,065 | 5/1987 | Bangerter | 379/351 |
| 4,792,967 | 12/1988 | Ladd et al. | 379/211 |
| 4,809,321 | 2/1989 | Morganstein et al. | 379/211 |
| 5,007,000 | 4/1991 | Baldi | 379/34 |
| 5,046,085 | 9/1991 | Godsey et al. | 379/112 |
| 5,187,735 | 2/1993 | Garcia et al. | 379/211 |
| 5,199,062 | 3/1993 | Von Meister et al. | 379/196 |
| 5,271,058 | 12/1993 | Andrews et al. | 379/210 |
| 5,274,700 | 12/1993 | Gechter et al. | 379/210 |
| 5,309,512 | 5/1994 | Blackmon et al. | 379/210 |
| 5,311,572 | 5/1994 | Friedes et al. | 379/201 |
| 5,329,578 | 7/1994 | Brennan et al. | 379/201 |
| 5,375,161 | 12/1994 | Fuller et al. | 379/210 |
| 5,384,831 | 1/1995 | Creswell et al. | 379/201 |
| 5,402,472 | 3/1995 | Morganstein et al. | 379/67 |
| 5,408,527 | 4/1995 | Tsutsu | 379/211 |
| 5,479,496 | 12/1995 | Endo et al. | 379/212 |
| 5,502,761 | 3/1996 | Duncan et al. | 379/142 |
| 5,509,062 | 4/1996 | Carlsen | 379/210 |
| 5,515,422 | 5/1996 | Melampy et al. | 379/67 |
| 5,548,636 | 8/1996 | Bannister et al. | 379/201 |
| 5,557,668 | 9/1996 | Brady | 379/212 |
| 5,583,929 | 12/1996 | Ardon | 379/230 |
| 5,592,541 | 1/1997 | Fleischer, III et al. | 379/211 |
| 5,619,557 | 4/1997 | Van Berkum | 379/201 |
| 5,987,110 | 11/1999 | Malik et al. | 379/196 |

*Primary Examiner*—Krista Zele
*Assistant Examiner*—Benny Q. Tieu
*Attorney, Agent, or Firm*—Oblon, Spivak, McClelland, Maier, & Neustadt, P.C.

[57] ABSTRACT

A system, method and computer program product implement a Virtual Network Call Processor with a CALL PULLBACK mechanism for providing a type of screened call transfer. Callers, while attempting to contact an intended recipient, have their calls sent to the Virtual Network Call Processor, which places the caller on soft hold while attempting to locate the intended recipient. The Call Processor uses another external line to call the intended recipient at one of a number of predetermined locations identified by stored numbers where each number is serviced by perhaps different local telephone equipment having different characteristics and attributes. The CALL PULLBACK mechanism is used to identify signaling attributes of signals provided by the respective local telephone equipment, by analyzing frequency and cadence information from the signals and normalize the signals so as to detect a status of the Call Processor's attempt to reach the intended recipient. The signaling attributes and customer-specific information are controlled by objects, which are well thought out pre-programmed and proven software constructs that simplify programming and ensure reliable operations. The calling party is kept on soft hold while the intended recipient of the call is attempted to be contacted at the different locations. If the CALL PULLBACK mechanism determines that the signals provided by the local telephone equipment, after being normalized, indicate the intended recipient does not pick up the call, the CALL PULLBACK mechanism attempts to reach the intended recipient at another one of the numbers, all the while the calling party is kept on soft hold. In this way, the global Virtual Network Call Processor, is capable of servicing not only individuals and companies serviced by a single PBX with a call process, but also for any number of other users not serviced by the PBX.

21 Claims, 10 Drawing Sheets

6,088,437

CALL PROCESSING SYSTEM, METHOD AND COMPUTER PROGRAM PRODUCT

CROSS REFERENCE TO RELATED APPLICATIONS

The present document claims the benefit of the earlier filing date of, and contains subject matter related to that disclosed in, U.S. provisional application Serial No. 60/082,730 filed Apr. 23, 1998, having common inventorship, the entire contents of which being incorporated herein by reference.

BACKGROUND OF THE INVENTION

1. Field of the Invention

The present invention pertains to call processing systems, methods and computer-based products used for telephony systems in which calls may be screened by a called party prior to connection. More particularly, the present invention is directed to voice and data systems that include Call Processors and Gateway Servers among other data communication resources, in which calls targeted for a predetermined location are directed by the programming of a Virtual Voice Network. This direction can be to any device that can be directly dialed, such as a telephone including cell phone, fax machine or modem even if the call for the targeted device is processed across the Internet, (voice or fax over Internet Protocol.)

2. Discussion of the Background

Advances in modern electronics and digital communication enable individuals to communicate virtually anywhere around the world. With the advent of cellular telephones, personal communication services, and satellite telephony, individuals in advanced as well as developing societies have an expectation of being able to communicate with others anytime and anywhere in a smooth and seamless fashion. The bulk of existing communication infrastructure is provided by local, regional and long distance telephone companies, i.e., the public switch telephone network (PSTN), which uses land lines, among other resources, for providing point-to-point communications, where each point is identifiable by a separate telephone number. For example, a caller may use a first telephone number when attempting to reach a person at the person's home, but uses a second number for contacting the person at the person's office.

A recent challenge has been how to use the PSTN, components of which contain old technology, to provide the flexibility to support people who want to remain accessible while being mobile. In light of this backdrop, some corporations use private branch exchanges (PBX) at the corporation facilities to provide "smart" functions for handling incoming phone calls (described generically here, but referring to both voice and data calls) for the convenience of its customers. Using these functions, even if an employee is not available, a properly equipped PBX enables an outside caller to be conveniently patched into voice mail, routed to another number, or perhaps transferred to a different facility in an attempt to handle the call in a user-friendly environment.

FIG. 1 is a block diagram of a conventional PSTN and PBX based system that enables a source telephone 1 to communicate with a destination telephone 11, of an intended recipient. In FIG. 1, the source telephone 1 connects to the PSTN 3 via a line (wired or wireless). The PSTN 3 recognizes the telephone number input at the source telephone 1 and provides the switch infrastructure to ultimately connect the caller with the PBX 9, which has the burden of providing the "operator" interface functions. In many cases, the corporation facilities 7 may incorporate a relay Call Processor with auto attendant functions 13 even though unit costs for such devices could exceed 1.5 million dollars in 1998. An example of such a Call Processor is an OVERTURE 300 sold by the Lucent/Octel Messaging Division.

The relay Call Processor with auto attendant 13 operates when the call is received by the PBX 9 and attempts to ring the destination telephone 11, while placing the caller on hold or utilizing any of a number of types of integration depending on the makes and models of the equipment. If the destination telephone 11 is not picked-up after a predetermined number of rings, the Call Processor with auto attendant 13 initially reports a message to the caller such as "thank you for calling company A. John Doe is on the telephone so please leave a message, dial another extension, or dial 0 for the operator." The Call Processor with auto attendant 13 is able to handle the call for the employee in this way because the PBX 9 receives and routes all telephone calls within the company facility 7 without having to interface with a variety of different local telephone equipment, each having unique signaling attributes.

For users that do not have the benefit of a corporation's PBX 9, the PSTN offers users a call forwarding operator 5 that, at the instruction of the intended recipient, forwards incoming calls to a secondary number when the intended recipient is unavailable at a primary number. This call forwarding mechanism however employs equipment at the PSTN and does not offer the same degree of convenient voice mail and auto attendant functions offered by the PBX 9 at the company facility 7.

As presently recognized by the inventor, the PBX 9 is an inherently "local" device hosted at a certain destination facility, such as a company. Available for equipment of such expense, smaller devices such as the relay Call Processor with auto attendant 13 are included with the PBX 9 to provide added functionality. Adding to the expense, the relay Call Processor with auto attendant 13 must be customized by technicians when installed at the company facility 7 so as to be compatible with the local telephone company equipment if any screened transfer types of calls were to be placed to external telephone numbers. Customization is needed because the PSTN 3 is not homogenous, but rather made up of numerous equipment of local telephone companies that may or may not have the same equipment. As an example of different signaling attributes of signals provided by typical telephone equipment, the frequency and cadence of slow-busy signals (or other signals, as will be discussed) may be substantially different from one local telephone to the next. Similarly, other signals such as a fast busy signal, indicating an error is present, differs as well.

FIG. 2 is a timing diagram of a ring/silence signal offered by exemplary local telephone company equipment. A high voltage level indicates a ring interval, while a lower voltage indicates a silence interval. For illustrative purposes, the interval "A" may typically range between a maximum tone-on (i.e., ring interval) of 1,200 ms to a minimum of 800 ms, while a typical number may be 1000 ms. The interval "B" (a silence interval) may range between 3500 ms and 2801 ms, with a typical number being 2881 ms. Interval "C" may typically range between 1200 ms and 800 ms, with a typical number being 942 ms. Interval "D" may typically range between 3485 ms and 2899 ms, with a typical number being 2910 ms. Similarly, the interval "E" may typically range between 1200 and 800 ms with a typical time 785 ms (which is less than the stated lower end of the "typical" range, but included to show that it is nonetheless a possibility). Due to this variation in cadence and frequency between signals provided by local telephone equipment, generic relay Call Processors with auto attendant functions are conventionally believed to require the use of technicians to personally customize the "application delays". This approach essentially normalizes the cadence and frequency terms so that the Call Processor can effectively interface with that particular local telephone equipment. Consequently, according to conventional wisdom, it is not believed wise, nor even possible, to use a relay Call Processor with auto attendant function in a central location that operates with different local telephone equipment because the diversity of telephone equipment does not permit the relay Call Processor with auto attendant to handle common signals in a like fashion.

FIG. 3 is a flowchart of an example method of how a caller at a source telephone 1 (FIG. 1) attempts to communicate with an intended recipient at the company facility 7. The process begins in step S1, where the caller initiates a call to the intended recipient by dialing a phone number of the company where the intended recipient is believed to be located. The process then proceeds to step S3, where the call is answered by the PBX 9 at the company facility 7, and the PBX 9 passes the call to the Call Processor with auto attendant 13. The process then proceeds to step S5, where the caller is requested to dial the extension of the intended recipient. The process then proceeds to step S7 where an inquiry is made regarding whether the individual identified at that extension is available. While making the inquiry, the Call Processor in the PBX 9 places the caller on hold and rings the destination telephone a predetermined number of times. If the intended recipient does not answer the telephone call after the predetermined number of times or if a busy signal is received, the Call Processor concludes that the intended recipient is unavailable. If the response to the inquiry in step S7 is affirmative, the PBX 9 connects the caller with the intended recipient in step S9 and the process then proceeds to step S11 where the call is completed and then the communication session ends. However, if the response to the inquiry in step S7 is negative, the process proceeds to step S13 where the relay Call Processor with auto attendant 13, audibly presents a set of options to the caller. Typical options include leaving a voice mail message, hitting zero to dial an operator or entering the extension of another party. Once the options are presented, the process proceeds to S15 where the caller selects an option and then in step S17 the selected option is executed. Subsequently the process ends. The Call Processor may also offer other options to the caller, such as attempting to contact the intended recipient at another location. If the caller chooses this option, the Call Processor with auto attendant 13 performs a blind transfer to that other location. Since the Call Processor with auto attendant 13 performs the blind transfer, the Call Processor performs no additional processing of the call even if the intended recipient is not available at the other location. The blind transfer will be made regardless; even if the called party is busy, ring no answer, error tone or dead air. Some coverage methods employ various call forwarding schemes in the event a called device is busy, or ring no answer. These methods are designed to forward the caller to a receptor mailbox. Often the receptor mailbox is located where the call originated and the called party pays the bill for any forwarding or long distance charges.

As identified by the present inventor, a limitation with conventional devices and methods is that the functions offered by the Call Processor in the PBX 9 are prohibitively expensive for the "small user". In other words, the call processing functions available at the company facility 7 are expensive to purchase and install, and thus are unsuitable for private use. Furthermore, due to differences between the different types of local telephone company equipment employed throughout the PSTN, making a conventional relay Call Processor with auto attendant available to users across a number of different local telephone company equipment is not believed to be possible, due to the different signaling attributes of the equipment employed by the different local telephone companies.

As presently recognized, the installation procedures of PBX 9 with the relay Call Processor are complex in that "hands on" customization and testing of the local telephone equipment is believed to be required in conventional systems when adjusting the destination delays for the relay Call Processor. Such difficulties are factors that contribute to the expense of purchasing and maintaining a Call Processor, even though conventional Call Processors are used over a specific geographical region sharing a common set of telephone equipment.

More centralized functions, such as call forwarding operations provided by the PSTN are incapable of detecting whether a person is available at one of the candidate locations, and "pulling back" the call for further processing if the person is unavailable. Moreover, the call forwarding operations perform a blind transfer of the call, and do not wait to determine whether the destination party will in fact receive the call. As a consequence, the user-friendliness of the call forwarding operation is presently viewed as being sub-optimal.

U.S. Pat. No. 5,375,161 describes a telephone control system with branch routing, which includes a call conferencing feature (see, e.g., FIG. 14', step 1491) that waits to determine whether or not a user may be located at another number. This technique thus employs precision busy/ring detection that requires a priori knowledge of the attributes of the local telephone communication equipment. Without this knowledge, it would not be possible for such a device to operate without significant customization of PSTN equipment at varying locations. Furthermore, the precision busy/ring would not be able to recognize an error tone, which has the same frequency as a busy but a different cadence, because the precision busy/ring unit monitors only frequency, not cadence. Cadence is a variable that fluctuates most from Central Office to Central Office. When considering a conference feature with voice, a number of conditions should be taken into consideration, including hardware sensitivity and ability to be configured, susceptibility to talk off in which the human voice emulates touch tone, and background noise. Regarding background noise, a PC modem, for example, connecting to a service provider for Internet access can cause any touch-tone activated equipment to do unexpected things. Thus, conferencing features are suboptimal.

SUMMARY OF THE INVENTION

Accordingly, a feature of the present invention is to provide a novel system, method and computer based product that overcomes the limitations of the conventional methods and systems discussed above. While a full description of the invention and its various features are described in the following section, a brief, non-exhaustive description of features of the present invention is now described. A facet of this invention is that the Call Processors used normally do not reside at the same location and are not directly connected to a customer's PBX or to the customer's Central Office. If the called party is busy/no answer or an error tone is encountered, the calling party is informed of the status of the called party and may be offered further options.

A "CALL PULLBACK" mechanism is included in a central location (i.e., accessible to geographically separated users) in a Call Processor, which is a component of a virtual Call Processor network. The Call Processor in the virtual Call Processor network places a caller on "soft hold" while attempting to contact the intended recipient at one of various predetermined numbers. In order to overcome the incompatibility issue of operating with different local telephone equipment, a feature of the present invention is a frequency and cadence detection mechanism that is able to detect different characteristics of slow busy, fast busy, ringing, answered, and ring no answer tones as provided by different local telephone equipment. To this end, the Call Processor of the present invention associates different frequencies and cadences with various events occurring with candidate numbers at which the intended recipient may be located. In the case of a call placed through a Gateway Server across the Internet the frequency and cadence detection may be performed by equipment located at the far end point of presence (POP) with that equipment notifying the originating Call Processor of the status of the call. Accordingly, a feature of the present invention is the establishment of acceptable ranges of frequency and cadence attributes of signals from various local telephone company equipment that service the respective candidate telephone numbers. To this end, the system incorporates a method for implementing the CALL PULLBACK mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

BRIEF DESCRIPTION OF THE APPENDIX

An appendix is attached hereto, that contains an application delay table with an index of available delays.

DESCRIPTION OF THE PREFERRED EMBODIMENTS

Figure 4:
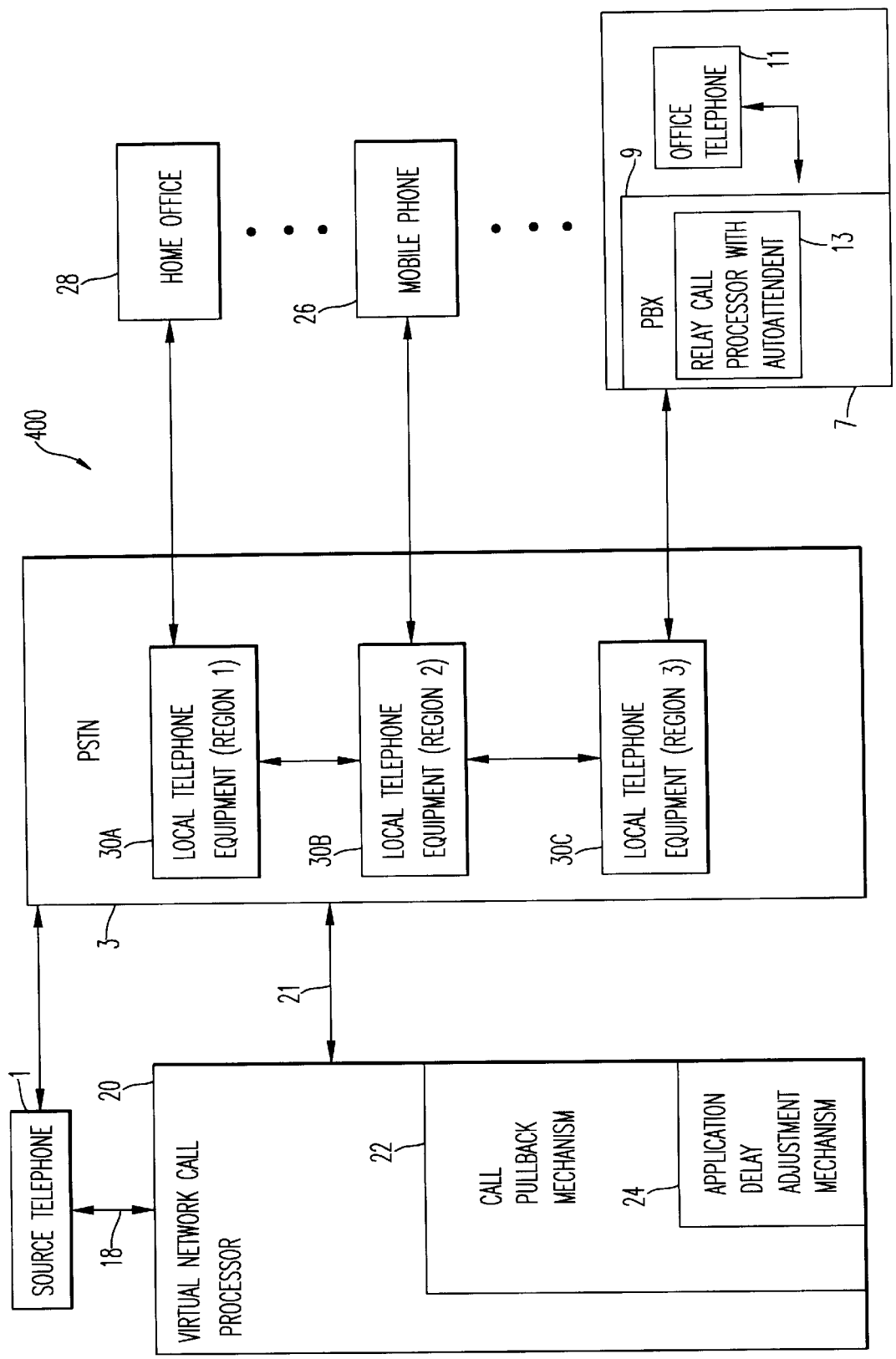
FIG. 4 is a system level block diagram of a Virtual Network having a central Call Processor according to the present invention.

Referring now to the drawings, wherein like reference numerals designate identical or corresponding parts throughout the several views, FIG. 4 is a system level block diagram of a network 400 according to the present invention. A feature of the network 400 is a Virtual Network Call Processor 20 that is separated from the company owned facility 7 located on property owned by an employee of a customer who subscribes to the network 400. The Virtual Network Call Processor may be implemented as a VIRTUAL VOICE NETWORK NODE, offered by TOUCH-TONE TECHNOLOGIES Inc. (T3i) and includes a variety of equipment, including a switch, one or more Call Processors with on-board IVR units, multiple T1-spans and or a Gateway Server or Servers that may reside on a network (such as a local area network, LAN) with other equipment. As will become clear, the Virtual Network Call Processor 20 may also operate completely independently of equipment owned and operated by private corporations, and may be used to provide Call Processor, auto attendant, IVR and facsimile functions for individuals with no access to corporate PBX resources. The Virtual Network Call Processor 20 may also be adapted to provide plug-in applications such as Unified Messaging where e-mail may be stored in a mailbox along with voice and fax messages. These e-mail messages may then be read by the voice server to the subscriber. In particular, the Virtual Network Call Processor 20 connects via private or public lines 18 to a source telephone 1. The private or public lines 18 may be part of the PSTN 3, or private lines owned or leased by individual consumers. While the term "lines" is used, these lines may also be wireless links such as private microwave links, or terrestrial or space-based cellular and wireless communication links, or an Internet Backbone employing Gateway Servers for example. Furthermore, the source telephone 1 need not be a conventional telephone, but may also be other communication devices that transmit data from one location to another such as a facsimile device, computer, computer telephone or Internet accessible terminal, for example.

Figure 1:
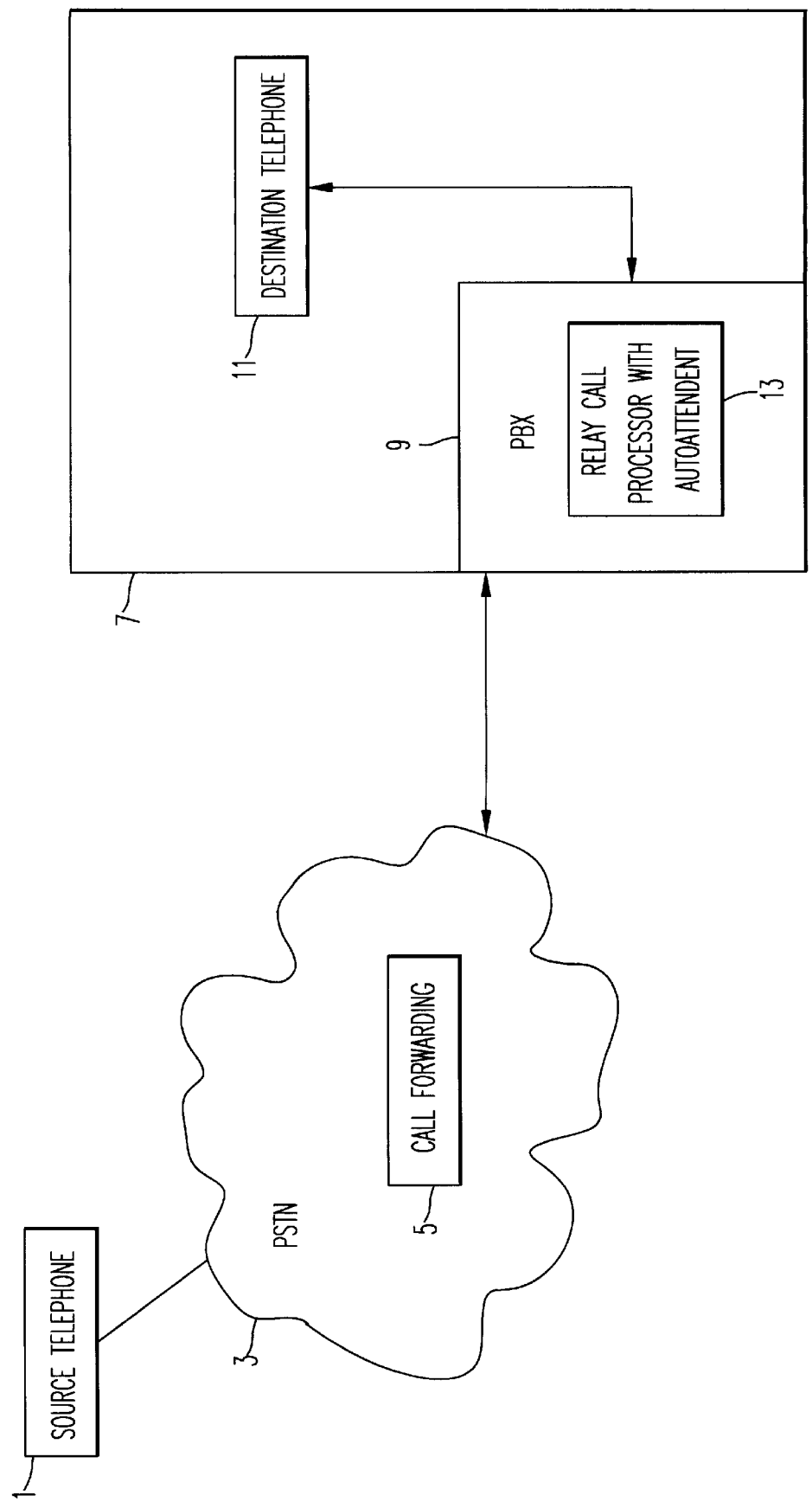
FIG. 1 is a system level block diagram of a conventional telephony network that includes a Call Processor at a destination facility.
Figure 2:
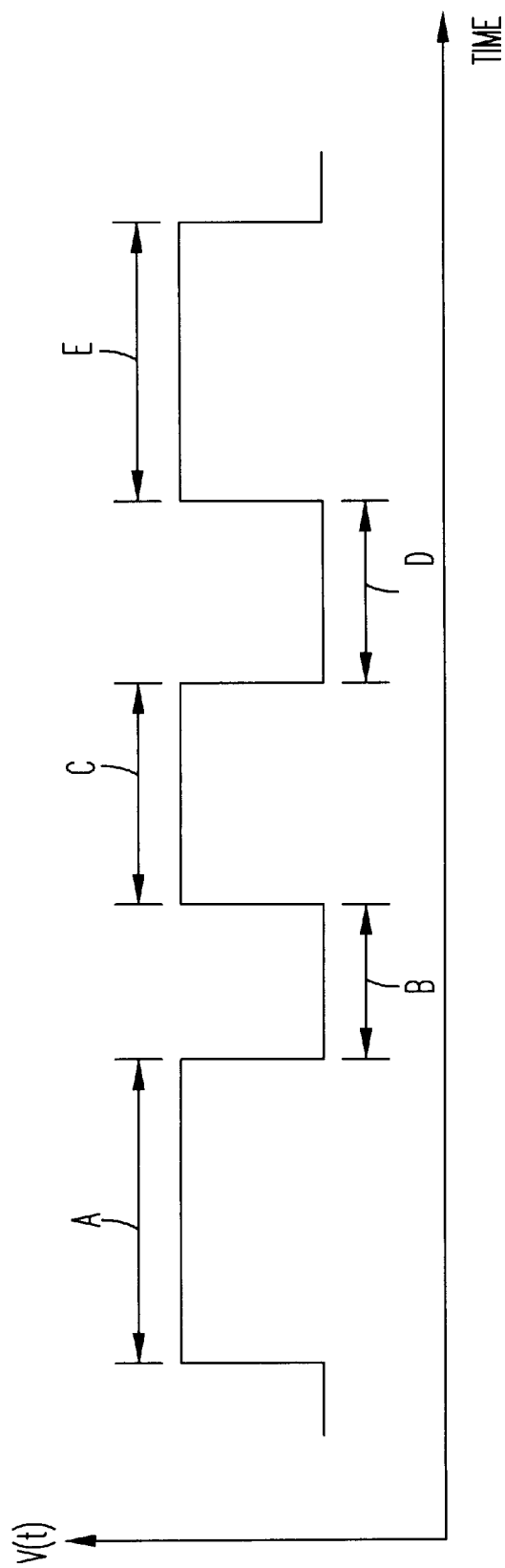
FIG. 2 is a timing diagram illustrating an exemplary variation in cadence and frequency of signals provided by different local telephone equipment.
Figure 3:
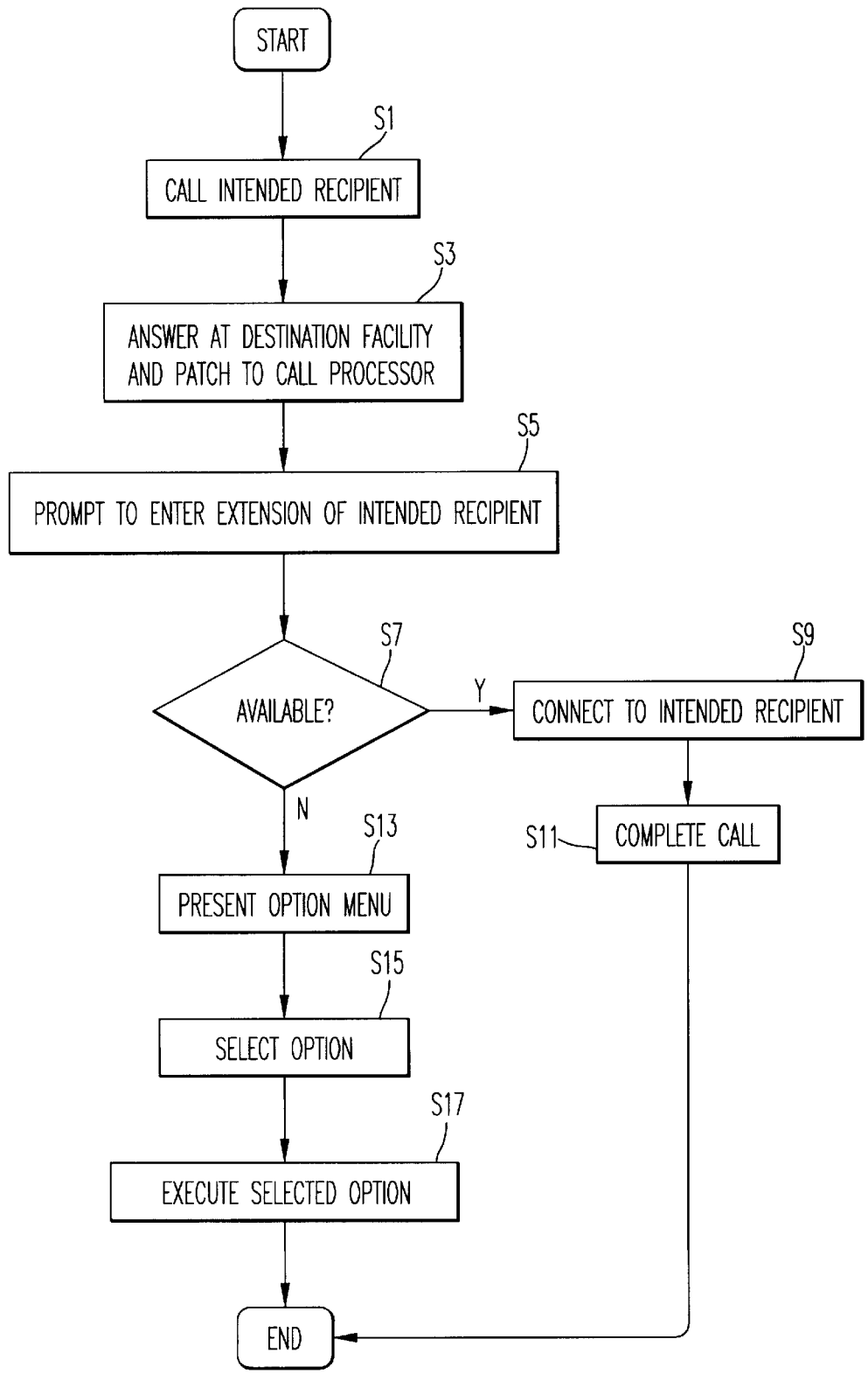
FIG. 3 is a flowchart of a method for handling a call in a conventional relay Call Processor.

The Virtual Network Call Processor 20 connects to both the source telephone 1, as well as the PSTN or Internet Backbone through a Gateway Server 3, by way of communication links 21, which may be private or leased lines, for example. The source telephone 1, also connects directly to the PSTN 3, which is made up of an interconnected network of equipment owned by companies that service different regions of the United States (or the equivalent of other national and private communication networks in other countries). The PSTN 3, illustrated in FIG. 4, includes an interconnected network of three sets of local telephone equipment 30A, 30B and 30C, located in three geographically distinct regions (region 1–region 3). As previously discussed, the local telephone equipment 30A–30C are often different systems that have different signaling attributes. For example, the telephone equipment 30A may produce a fast busy signal with different signal features than that of local telephone equipment 30C. In particular, as presently recognized, the difference may be in the form of frequency and cadence differences, where "frequency" refers to signal pitch and "cadence" refers to a rhythm of the respective on and off tone cycles that form a beat. Thus, local telephone equipment 30A, which may service a home office 28 may have distinctive frequency and cadence characteristics as compared with that of the local telephone equipment 30B that services the intended recipient's mobile telephone 26, or the local telephone equipment 30C that services the office telephone 11 at the office facility 7. While the PBX 9 at the office facility 7 can receive the phone call directly from source telephone 1, the PBX 9 is capable of only transferring the call internally with devices connected to the PBX 9 or relying on a call forwarding mechanism 5 offered by the local telephone equipment 30C (see, e.g., FIG. 1).

However, by subscribing to services offered by the Virtual Network Call Processor 20, the intended recipient is given the option to invoke the CALL PULLBACK mechanism 22 in the Virtual Network Call Processor 20, which, if desired, allows the user to have calls sent to one of any number of candidate locations, each of which may or may not be serviced by different local telephone equipment. Moreover, because the Virtual Network Call Processor 20 is centrally located (i.e., accessible to parties external to a company's PBX 9), the Virtual Network Call Processor 20 is available for use by many different users, not just users of the PBX 9. Each user can have phone calls that originate at the source telephone 1 be forwarded to the Virtual Network Call Processor 20 and thereby invoke the CALL PULLBACK mechanism 22. The CALL PULLBACK mechanism enables a screened type of call transfer, as compared to a blind transfer where the call is sent to one of several candidate locations without regard for whether the user actually picks up the transferred call at that location.

The Virtual Network Call Processor 20 is shown as part of a node that is made up of a Call Processor, PBX, IVR and other equipment. However, the node may be included as part of a hub, where a hub is one or more digitally networked Call Processors and PBX systems (as will be discussed later in reference to FIG. 8).

The process flow for handling a new telephone call is described below, followed by several examples that illustrate how the CALL PULLBACK mechanism 22 is employed. A caller uses a source telephone 1 to attempt to contact an intended recipient at an office telephone 11. The call originating at the source telephone 1 is switched through the PSTN 3 and routed to the PBX 9 at the office facility 7. The PBX 9 then presents the caller with an inquiry, asking the caller to identify an extension for the office telephone 11. In response, the caller enters an extension and the PBX 9 attempts to route the telephone call to the office telephone 11. If all the lines to the PBX 9 are busy, or if there is a ring, but no answer at the destination telephone 11, or all calls are directly forwarded to the Virtual Network Call Processor 20 using the call forward mechanism in the local telephone equipment, the Virtual Network Call Processor 20 receives the call and subsequently processes the call. Alternatively, the call may be transferred directly into the Virtual Network Call Processor 20 by an operator or other company personnel at the office facility 7. As a further alternative, a caller may dial directly into the Virtual Network Call Processor 20, or be forwarded in by call forwarding previously set up at the customers Central Office 30C under the following conditions:

Ring no answer on the companies main number or numbers.

An example of this usage could be that no one is available to answer, i.e. after hours, weekends, holidays or the company has suffered a catastrophe in which the facility has been destroyed. A Virtual Voice Network utilizing CALL PULLBACK technology may be programmed to allow designated personnel at a company to call into a Node, enter a password and with a few keystrokes have callers processed to telephones other than those at the company such as the home telephones of company personnel. Even if the company is physically gone, business may still be conducted.

Busy on the company's main number or numbers.

All trunks or lines are busy due to traffic or being busied out at the central office while repair or reprogramming work is being performed.

All calls forward with or without ring reminder.

Some companies provide an after hours courtesy to their callers by taking the time to program their main number so that it forwards to a Virtual Voice Network Node without the caller having to listen to a number of rings.

Forwarding with multiple talk paths.

In the case of a customer location with only one truck or line, one or more callers may reach a Node at the same time when the given line has multiple talk paths.

When the call is transferred to the Virtual Network Call Processor 20, the Virtual Network Call Processor 20 recognizes the telephone number that the source telephone 1 was attempting to contact by using direct inward dial, (D.I.D.), automatic number identification, (ANI), or direct number identification system, (DNIS). If the telephone number is associated with an office location, the caller is presented with an options menu (described in audible format) asking the caller to select the person or department with whom the caller wishes to speak. Once selected, the caller is placed on soft hold, while the Virtual Network Call Processor 20 dials an external telephone number and initiates a call progress tone detection operation as will be discussed with respect to FIG. 5. The CALL PULLBACK mechanism 22 may then consult a list of stored candidate numbers at which the intended recipient may be located, where the numbers stored are provided by the intended recipient when the intended recipient enters (or updates) a user profile, perhaps when the intended recipient originally subscribes for service. Sequentially, the CALL PULLBACK mechanism 22 attempts to contact the intended recipient at the respective destinations (for example home office 28 or mobile phone 26). If the intended recipient is not located at the first candidate location, the call is "pulled back" and if desired by the customer the CALL PULLBACK mechanism 22 informs the caller that it is about to dial the next location as well as offering the caller other options such as leaving a message. If the caller does nothing, the CALL PULLBACK mechanism 22 may consult from memory the next candidate number, and then attempt to contact the intended recipient at that next candidate number. The CALL PULLBACK mechanism 22 may operate in this fashion until all of the candidate locations have been investigated. If the intended recipient has still not been located, the Virtual Network Call Processor 20 allows the caller the options of leaving a message, contacting an operator, or dialing another extension, for example. On the other hand, if the caller is available at one of the candidate locations, the caller remains on soft hold, while the virtual call network processor 20 presents the intended recipient with a call announcement, such as "this is a call for XYZ Engineering Company, press # to accept or * to reject". If the call is accepted, the calling party and the intended recipient are connected. If the call is rejected, the calling party is informed that the "name" does not answer and is offered further options, such as speaking with an operator, leaving a voice mail message or dialing another extension for example.

While the calling party is placed on soft hold, the CALL PULLBACK mechanism 22, begins a call process tone detection operation, while dialing the external telephone number, as will be discussed with respect to FIG. 5.

The connection that is made by the Virtual Network Call Processor 20 may be made to any phone or device that can be dialed directly, even if the call is placed over the Internet, voice over Internet Protocol. Examples of such devices include cell phones (terrestrial and satellite based), direct inward dial (D.I.D.) telephone numbers, business or home telephone numbers, "Multiserve" or similar service telephone numbers, facsimile devices, computers, etc. A feature of the Virtual Network Call Processor 20 is that the transfer of the call from the Virtual Network Call Processor 20 is made to the intended recipient even though the intended recipient is located on a different PBX than the transferring party.

However, the vast majority of the calls processed are to company departments or fixed locations rather then people who are moving from location to location. In such cases, a call is processed to a given telephone and if not answered, the caller is offered the options of leaving a voice mail message, dialing another extension, dialing 0 for the operator or returning to a portion of the menu where another selection can be made.

Figure 5:
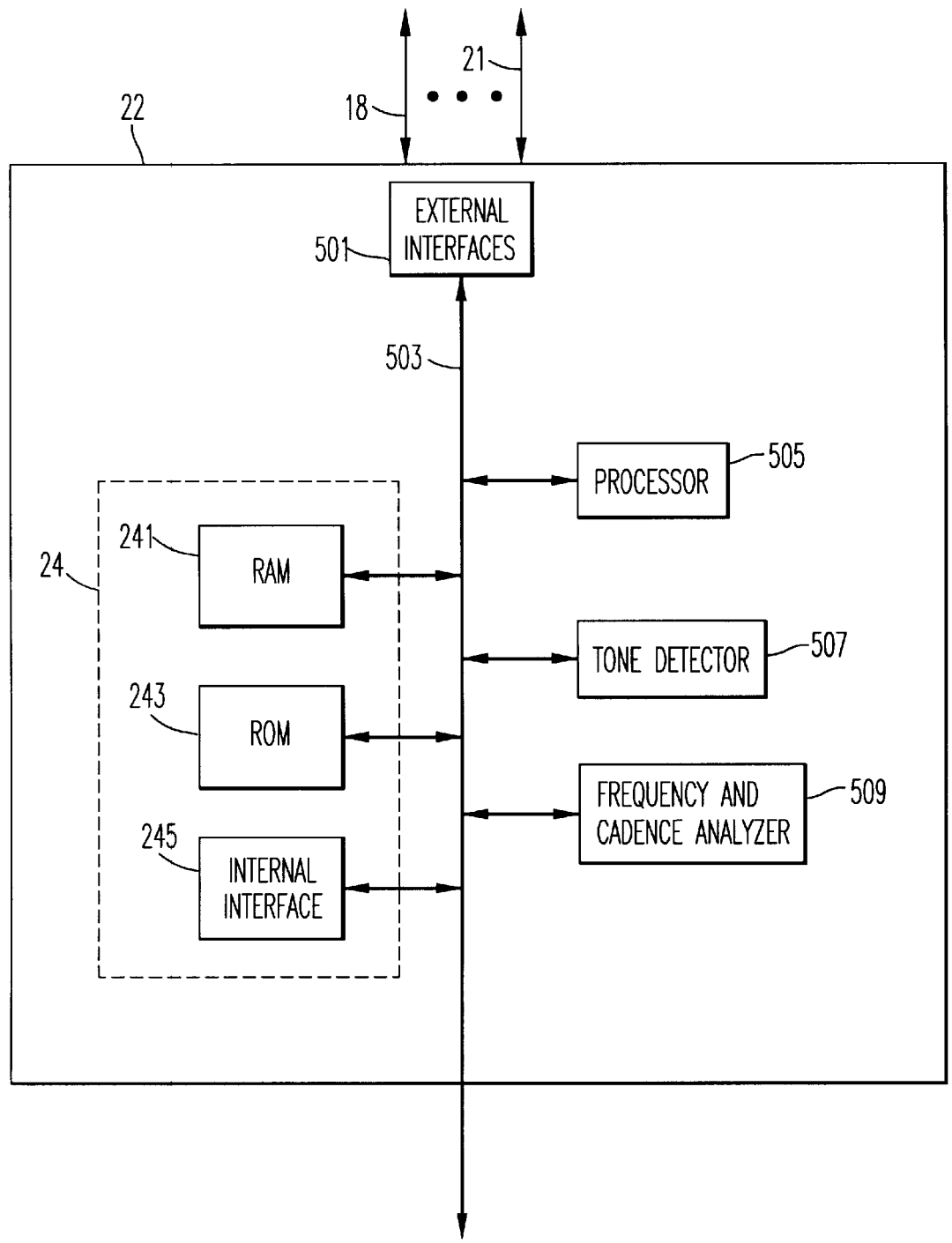
FIG. 5 is a block diagram of components in the CALL PULLBACK mechanism according to the present invention.

FIG. 5 is a more detailed block diagram of the CALL PULLBACK mechanism 22 shown in FIG. 4. The call pullback mechanism 22 includes an application delay adjustment mechanism 24 as shown in FIG. 4, the components of which include a random access memory (RAM) 241, read only memory (ROM) 243, hard disk drive (not shown) and internal interface 245 that are connected to a bus 503. An external interface circuit 501 provides the physical interface, and lower level protocol operations for communicating data between the bus 503 and the private or public lines 18 and 21, which ultimately connect to the source telephone 1 and PSTN 3 as shown in FIG. 4. Additional lines may connect to the external interface 501. A processor 505 is a single processor, although multi-processor architectures, as well as hybrid processor and digital signal processor components may be used as well. Additional processors may be included in the CALL PULLBACK mechanism 22, such as in the application delay adjustment mechanism 24, tone detector 507 and frequency and cadence analyzer 509. Operationally, the transferred call comes in through line 21 to the external interface 501, but alternatively, in a direct dial context, the call may come in directly through line 18. Subsequently, the external interface 501 identifies the party to be called, and retrieves a data file associated with the intended recipient, as identified in the call, by way of the bus 503. Part of data file is a first candidate number, which the CALL PULLBACK mechanism 22 will attempt to contact the intended recipient. The intended recipient's call is placed on hold, while the processor 505 initiates another call on an external line (one of the other lines 18–21).

The tone detector 507 is placed on this external line, so as to determine the call progress status of the call made on the external line. The CALL PULLBACK mechanism 22 places the tone detector 507 on the external line so as to determine if a type of busy signal is present. If the busy signal is present, the calling party is removed from hold and the intended recipient's greeting or, alternatively, the intended recipient's name and condition is audibilized to the calling party. At this time, additional options may be offered to the calling party. However, if no busy signal is detected, the CALL PULLBACK mechanism 22 sends out a series of ticking sounds so the called party will know that this is a call from their Virtual Voice Network and if they choose to wait they will hear the announcement of the type of call they are receiving, example, (Sales verses Customer service) and press # to accept, or * to reject before or after the announcement is made.

The frequency and cadence analyzer 509 characterizes different types of signals from the local telephone equipment serving the candidate location at which the intended recipient is attempting to be located. The signals to be detected include slow busy signals, fast busy signals, ringing signals, answered signals, and ring no answer signals so that additional candidate locations may be searched and/or the caller may be informed of the status of locating the intended recipient. The frequency and cadence analyzer 509 includes a predetermined set of operations that are intended to interpret the various busy signals, ringing signals, answered signals and the like produced at the far end central office. All frequency and cadence analysis is done on the fly by the frequency and cadence analyzer 509 which consults the application delay table for acceptable cadence values.

As previously discussed, the frequency and cadence of different signals varies between local telephone companies equipment. Accordingly, the frequency and cadence analyzer 509 communicates over the bus 503 to receive the application delay parameters from the application delay adjustment mechanism 24. These parameters are included in the RAM 241, although may also be included in the ROM 243 (conveniently implemented as an EEPROM) or at a remote memory accessible by the internal interface 245, by way of the bus 503.

Alternatively, the frequency and cadence analyzer 509 includes an acoustical signature mechanism that compares respective acoustical signatures against a saved set of acoustical signatures saved in the ROM 243, so as to determine if the response received from the local telephone equipment is a slow busy, a fast busy, etc. The frequency and cadence analyzer 509, also incorporates pattern recognition software that attempts to compare and identify signals received from local telephone equipment, on an on-the-fly basis. If no busy signal is detected, the frequency and cadence analyzer 509 sends out a series of ticking sounds and when the call is answered, a call announcement operation is conducted. The ticking sounds are sent out to alert the called party that their Virtual Voice Network is calling and not someone else. During or after call announcing the called party may then chose to accept or reject the call or if more then one part of the Network directs calls to them they may choose to listen to the full call announcement before accepting or rejecting the call.

The processor 505 includes an internal memory for program storage and holding intermediate calculation results. However, ROM 243 also includes a number of software objects that are invoked by the processor 505, when analyzing and assessing the respective attributes of the local telephone equipment.

Figure 6:
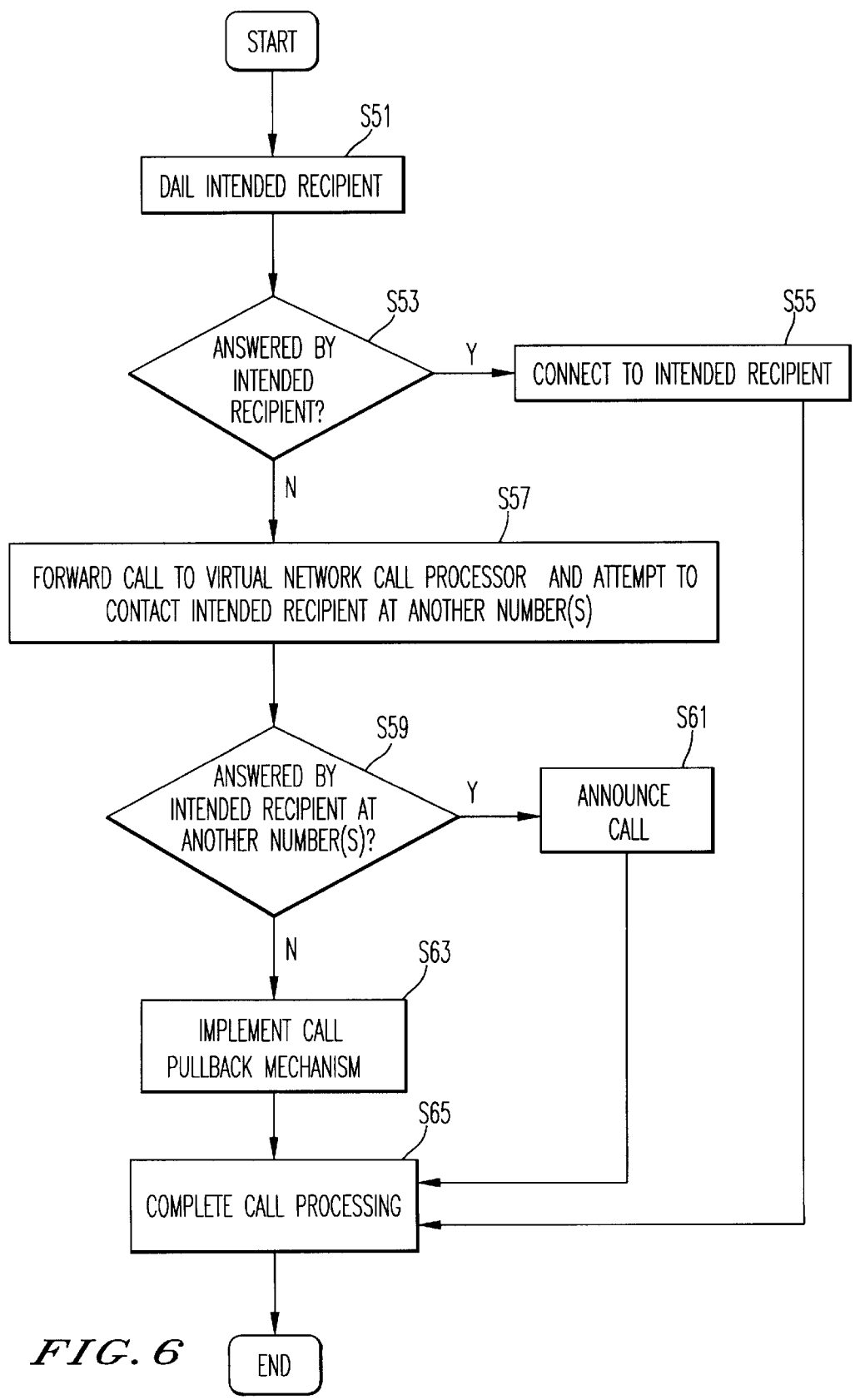
FIG. 6 is a flowchart of a process for contacting an intended recipient by way of the Virtual Network and implementing the CALL PULLBACK mechanism according to the present invention.

FIG. 6 is a flowchart of a process flow for contacting an intended recipient by way of the Virtual Network Call Processor 20 as it implements the CALL PULLBACK mechanism. The process begins in step S51, where the calling party dials the number for the intended recipient at a particular number. The process than proceeds to step S53, where an inquiry is made regarding whether the intended recipient answers the phone call (perhaps by way of a local PBX, such as PBX 9 in the office facility 7 of FIG. 4). If the intended recipient answers the phone call, the process proceeds to step S55 where the phone call is connected to the intended recipient, and subsequently the process proceeds to step S65 where all the call processing is completed. Alternatively, steps S51, S53 and S55 may be performed by dialing directly the office number of the intended recipient, thereby bypassing the virtual call network processor 20. If the intended recipient is unavailable to answer, the local central office invokes a call forwarding operation that forwards the call directly to the Virtual Network Call Processor.

A majority of the time a given caller reaches a Virtual Voice Network is because the caller was calling a company rather then an individual. Although no two Virtual Voice Networks need to be identical, the majority of them greet the caller and instruct the caller to enter an extension number or choice. Some extensions do not process calls, some only process calls to a single number all of the time and some process calls to multiple numbers. CALL PULLBACK is invoked when a caller is offered other options after placing an unsuccessful call to a telephone not residing at the same location and not directly connected to the T3i Virtual Voice Network. Call announcing and dialing multiple phone numbers are enhancements that the customer may or may not wish to use.

If the response to the inquiry in step S53 is negative, the process proceeds to step S57 where the call is forwarded (transferred) to the Virtual Network Call Processor 20, where the Virtual Network Call Processor 20 attempts to contact the intended recipient at one of the predetermined numbers stored at the Virtual Network Call Processor 20. In step S57 the caller is placed on soft hold, while an attempt is made to contact the intended recipient by way of an external line. The process then flows to step S59, where an inquiry is made regarding whether the intended recipient answers the call from the Virtual Network Call Processor at a first number stored in the Virtual Network Call Processor 20. Step S59 may have to be repeated if the intended recipient is not located at the first number and additional numbers are included in the intended recipient's profile that may be automatically checked by the Virtual Network Call Processor 20.

If the response to the inquiry in step S59 is affirmative, the Virtual Network Call Processor announces the call to the intended recipient in step S61. By announcing the call, the intended recipient has the option to receive the telephone call from the calling party, or have the Virtual Network Call Processor inform the calling party that the intended recipient is unable to receive the call. By announcing the call to the intended recipient, the intended recipient knows how to answer the phone, for example, when the calling party's call is taken off soft hold, and connected to the intended recipient's telephone. After step S61, the process proceeds to step S65, where call processing is completed and subsequently the process ends. On the other hand, if the response to the inquiry in step S59 is negative, the Virtual Network Call Processor invokes the CALL PULLBACK mechanism where the call remains on soft hold, and an external line (either the same external line as before, or another line) is used to attempt to contact the intended recipient at the next number identified in the profile of the intended recipient. Using this example, the CALL PULLBACK mechanism would remove the caller from soft hold and announce that the called party was unavailable and offer further options, one of which could be to dial another number. This process of tracking-down the intended recipient proceeds until all of the candidate locations have been exhausted, at which time the Virtual Network Call Processor either takes a voice mail message, asks the calling party if they would like to identify another person to whom to route the call, etc. Of course, if the CALL PULLBACK mechanism successfully contacts the intended recipient, and the intended recipient decides to receive the call, the caller is then taken off hold, and connected to the intended recipient. Subsequently, the process is completed in step S65 and the process ends.

Application delays are timing values set in the Call Processor portion of the Node. Delays described in the Appendix are used to detect critical tone cadences that the Central Office provides to the Node equipment. These cadences indicate specific call conditions such as a ringback tone indicates that a called number is ringing, and a busy indicates that the called party is busy.

Cadence values are normally set by selecting a PBX type and making modifications to the equipment as needed. As it is not known what PBX type a given Central Office would have or what effect the state of repair of software level would have on the cadences provided, a starting point is to choose the PBX closest to the one which was part of a first node implemented by a user of the system.

After adjusting the Call Processor's cadence recognition to the first Central Office PBX, new adjustments can be made as Central Offices are added and tested to make sure that the new adjustments work with previous Central Office PBXs'. Fail-safe mechanisms are included as features of the CALL PULLBACK to catch any caller that hit an unexpected cadence. These fail-safe mechanisms allow callers the options of reaching a live operator or leaving a message as well as providing first hand intelligence regarding what happened and where an unexpected event occurred. As the system matures, the fail-safes are not needed as frequently because the system's attributes will become more completely characterized with time.

Problems chiefly occur in areas where the Call Processor detects an answered condition while monitoring a single interrupted-ringback and with slow-busy and fast-busy cadences. When a call is screened, the equipment looks for acceptable cadences for a single interrupted ringback, slow-busy, fast-busy or that the call has been answered. To process a transfer application-delay, indexes are referenced that show the maximum and minimum ON/OFF periods for any tone. If the tone cadence detected does not comply with the ranges set for single ring back, slow busy or fast busy, the Call Processor determines that the call has been answered and the call transfer is completed.

In the case of dead air, such as the Central Office dropping the call, the caller would be removed from soft hold and a fail-safe mechanism would take over. One problem that occurs is when a Central Office recording is played such as an all circuits are busy or that the person being called is out of the area of unavailable. The Call Processor detects an answer and sound, such as someone speaking, and completes the transfer. These occurrences can be kept to a minimum and caller frustration reduced by the following methods:

Prior testing and identification—this allows the network designer to inform the customer of a potential problem and make needed changes or record a special greeting so that the caller has the opportunity to record a message or go to an operator before the called party's number is dialed;

Pulling the call back before the far end recording is played; and

Most customers and callers are used to the recordings being played and are not troubled by them. If the tone cadences are within acceptable ranges, call screening by the called party may be employed and the call accepted or rejected.

Figure 7A:
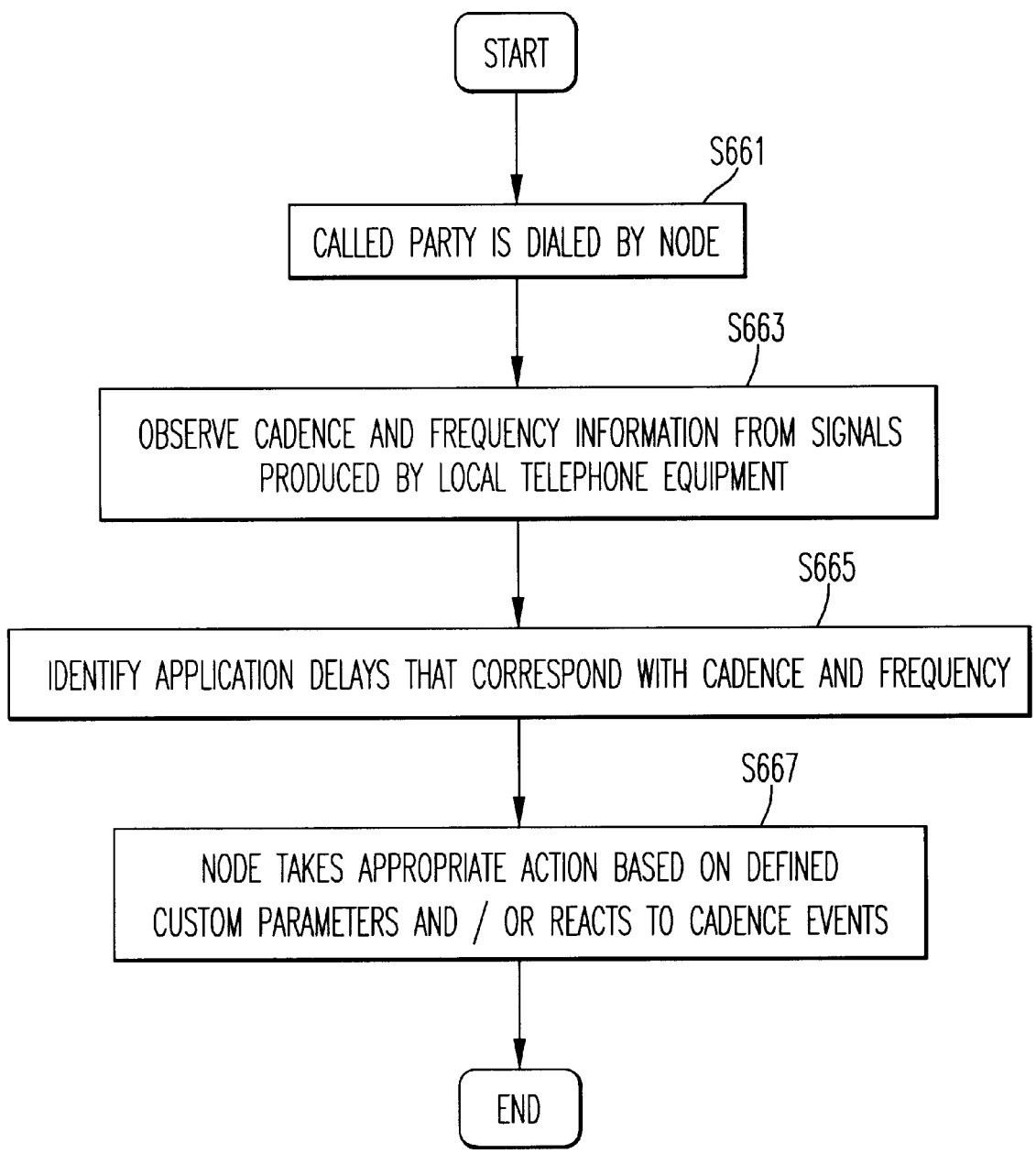
FIG. 7A is a flowchart of a process for identifying and associating local telephone equipment attributes with candidate customer numbers stored in a computer readable medium according to the present invention.

FIG. 7A is a flowchart of a process for identifying local telephone equipment attributes, such as frequency and cadence. The process begins in step S661 where the called party is dialed by a node. Subsequently, the process proceeds to step S663, where the cadence and frequency information from signals produced by the local telephone equipment is observed by the node. When observing the cadence and frequency information, the cadence and frequency information is characterized for subsequent processing. The process then proceeds to step S665, where application delays are identified that correspond with the frequency and cadence information that was characterized in step S663. The process then proceeds to step S667, where the node takes appropriate action for the call based on predefined custom parameters and/or reacts to the cadence events, where the reaction is a function of detecting which signals are in fact produced by the local telephone equipment. Subsequently, the process ends.

Figure 7B:
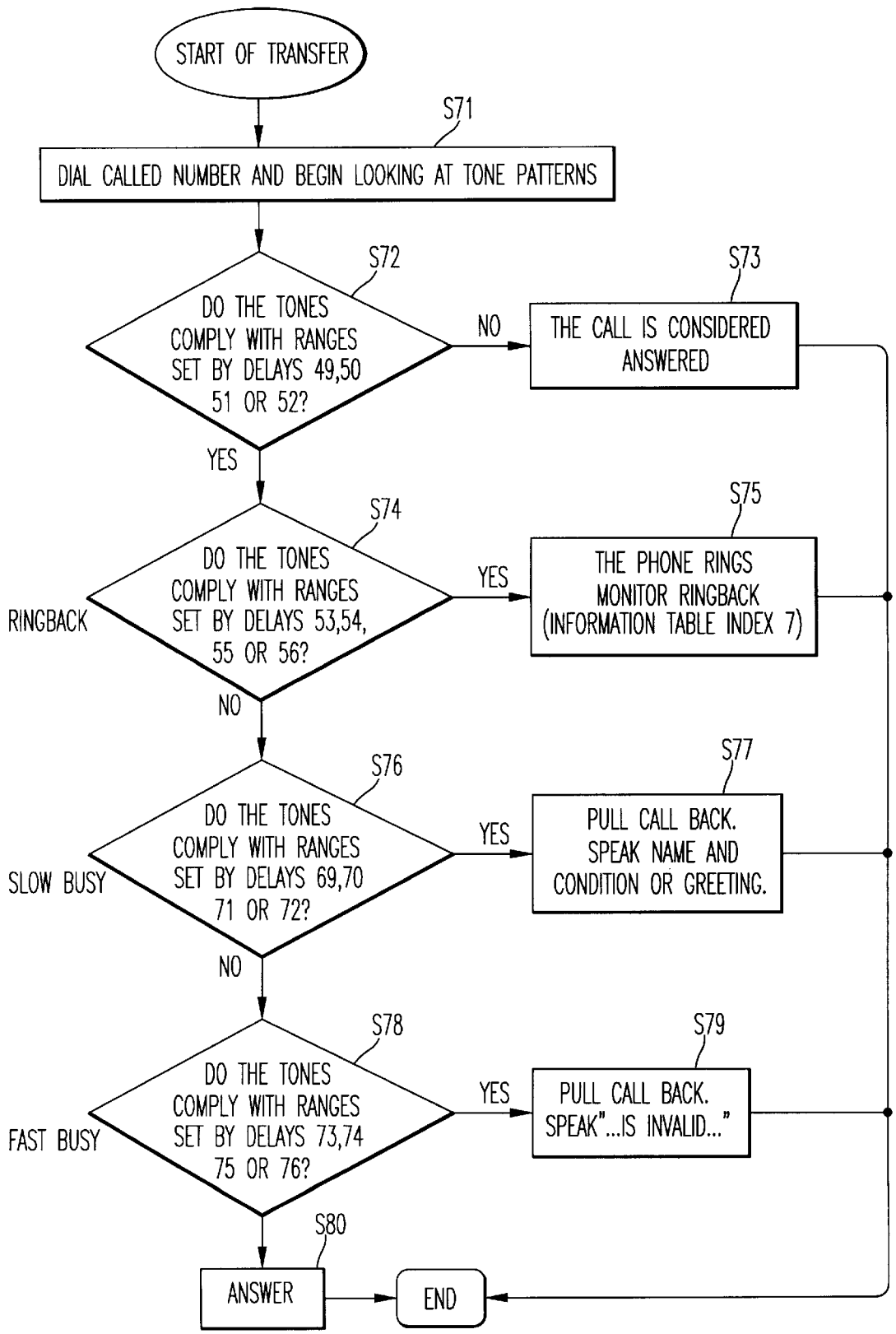
FIG. 7B is a flowchart of a call screening process employed by a Lucent/Octel Node-Overture Call Processor.

FIG. 7B is a flow chart of a process used by a NODE-OVERTURE Call Processor to screen calls. The process begins in S71, where the call is transferred and the NODE-OVERTURE Call Processor dials the called number and begins looking at tone patterns received from the local telephone equipment. Subsequently, the process proceeds to step S72, where an inquiry is made regarding whether the tones that are received comply with the ranges set by delays 49, 50, 51 or 52, as identified in the appendix attached hereto. If the response to the inquiry in step S72 is negative, the process proceeds to step S73, where the call is considered to have been answered, and subsequently the process ends. However, if the response to the inquiry in step S72 is affirmative, the process proceeds to a ring back inquiry in step S74, where an inquiry is made regarding whether the received tones comply with the ranges set by delays 53, 54, 55 or 56. If the response to the inquiry in step S74 is affirmative, the phone rings and a ring back is monitored. The ring back minimum and maximum tone off period are included in the appendix. The process then concludes.

However, if the response to the inquiry in step S74 is negative, the process proceeds to step S76, where a slow busy inquiry is made. The inquiry in step S76 inquires whether the tones comply with the ranges set by delays 69, 70, 71 or 72. If the response to the inquiry in step S76 is affirmative, the process proceeds to step S77, where the call is pulled back and the NODE OVERTURE Call Processor speaks the name and condition or greeting and subsequently the process ends. However, if the response to the inquiry in step S76 is negative, the process proceeds to the fast busy inquiry in step S78, and an inquiry is made regarding whether the tones comply with the ranges set by delays 73, 74, 75 or 76. If the response to the inquiry in step S78 is affirmative, the process proceeds to step S79, where the call is pulled back, and an indication is spoken indicating that the call is "invalid" and then the process ends. However, if the response to the inquiry in step S78 is negative, the call is answered in step S80 and then the process ends.

Figure 7C:
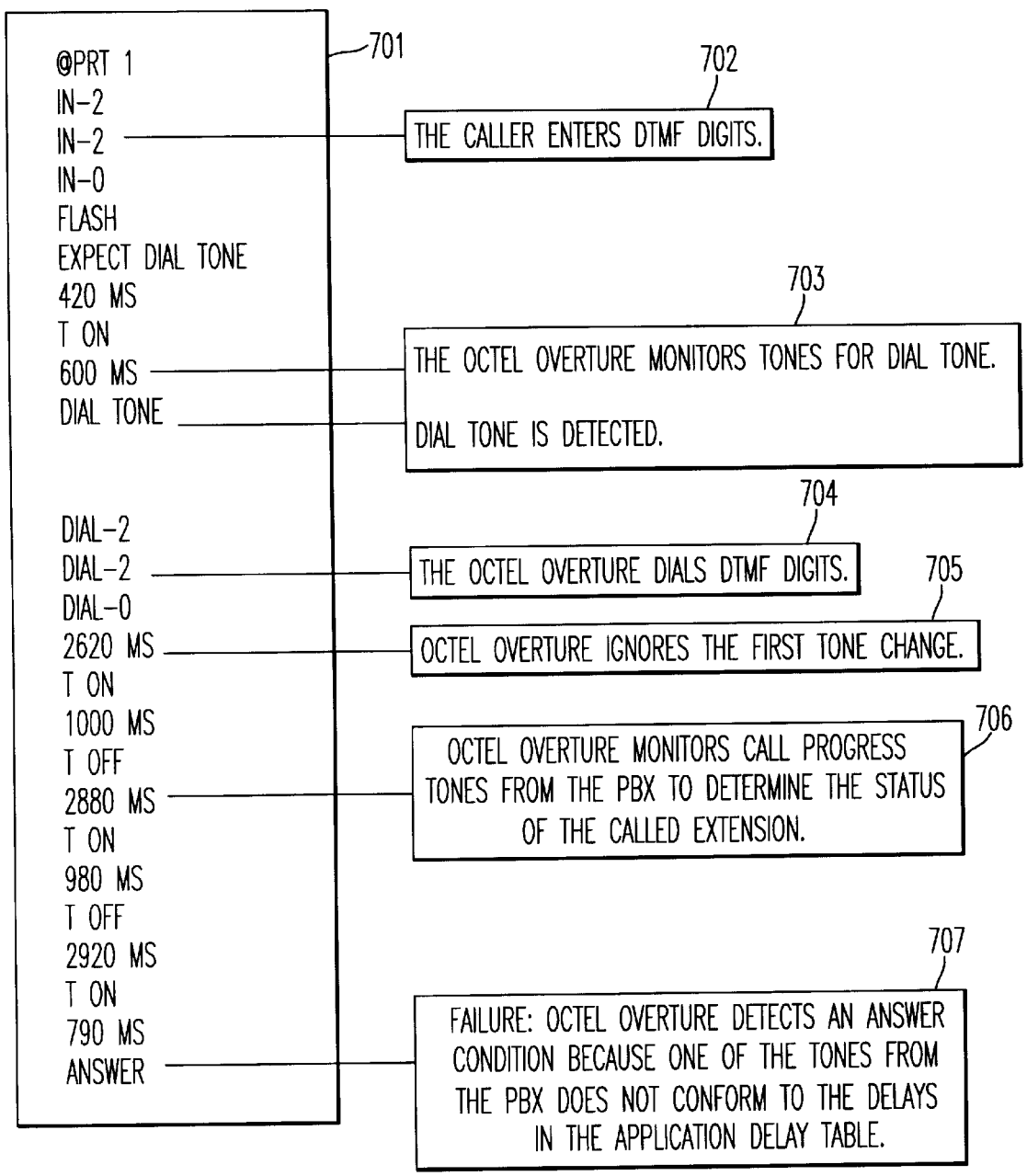
FIG. 7C is an annotated tone information screen for a failed ring-no-answer.

FIG. 7C is an exemplary display of information that would be displayed on a monitor screen for a situation where a ring-no-answer operation fails. Application delays that produce a failure are first tested by assigning a mailbox that dials the problem telephone number to a special area code specific object. The port specific print tone trace is activated and the node's Call Processor is called through the port in question. The port will have a speakerphone butt set placed on it so that there is an audible awareness on the part of the person performing the task so as to determine what events are in fact occurring. When answered, the test mailbox is dialed and the tone on and tone off events are monitored in milliseconds as shown on a computer screen. In FIG. 7C, a display 701, which may either be a simultaneous display, or printout or otherwise of a stream of code, illustrates tone information that is displayed for a ring-no-answer operation that fails. As shown in annotation 702, the caller enters DTMF digits, which are the digits associated with the phone to be contacted. In annotation 703, the NODE OVERTURE monitors the line for a tone associated with a dial tone and then subsequently detects the presence of the dial tone. Once the dial tone is detected, and annotation 704 shows that the NODE OVERTURE dials the number associated with the DTMF digits. Annotation 705 indicates that the NODE OVERTURE ignores the first change in tone for a predetermined period of time. Subsequently, as indicated in annotation 706, the NODE OVERTURE monitors call progress tones from the PBX so as to determine the status of the called extension. Finally, in annotation 707 a failure is indicated when the NODE OVERTURE detects an answer condition because one of the tones of the PBX does not conform to the delays in the application delay table, listed in the appendix.

The tone values in the print tone trace of FIG. 7C may be modified to the correct values by using the appropriate commands. For example, in the case of FIG. 7C, the application-delay indexes that refer to the error received are indexes 50 and 54, included in the appendix. Note that the failure occurred when the PBX sent a TONE ON for 790 ms. The NODE OVERTURE was set to expect a TONE ON (ring back) for no less than 800 ms and no greater than 1200 ms. This range between 800 ms and 1200 ms is referred to as the "window". In FIG. 7C, the window for the silence period (TONE OFF) between adjacent rings is set to no less than 2800 ms and no greater than 3400 ms. The TONE OFF values are within that window.

Figure 8:
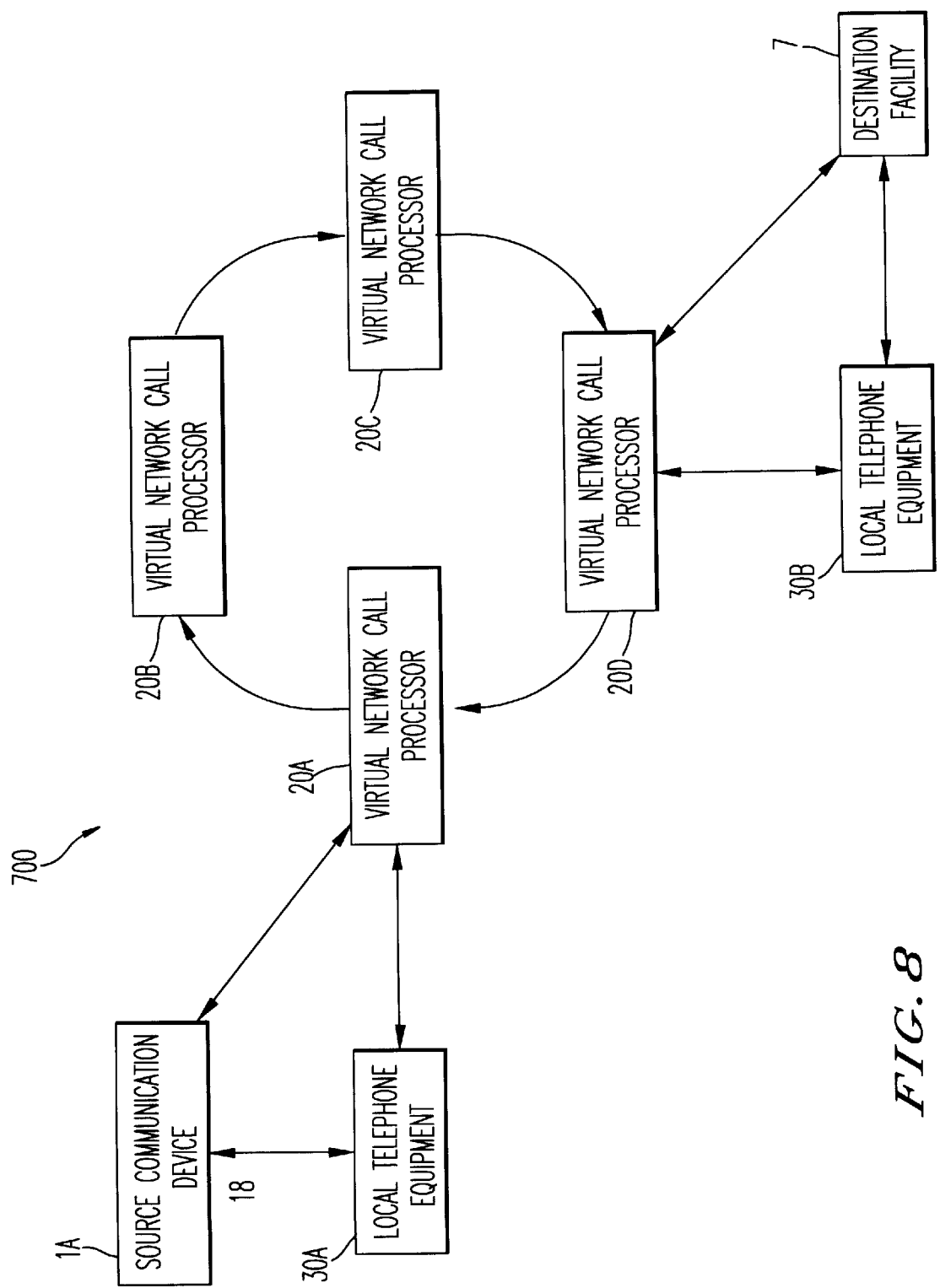
FIG. 8 is a block diagram of a network of interconnected Virtual Networks that enable both voice and fax messages and other signals to be transported from a source terminal to a destination facility.

FIG. 8 is a block diagram of an intelligent network of Virtual Network Call Processors (20A, 20B, 20C, 20D) connected together, as shown, in a ring configuration, although other configurations may be performed as well, such as a star or non-geometric specific interconnected configuration. Each of the Virtual Network Call Processors 20A through 20D is configured as several interconnected nodes, a node being a PBX having a Call Processor. The Virtual Network Call Processors 20A–20D are the respective hubs, and thus each serves a different geographical area. As a consequence, a source communication device 1A may connect to the Virtual Network Call Processor 20A (or other Virtual Network Call Processor 20B–20D) by way of the local telephone equipment 30A, or directly to the Virtual Network Call Processor 20A. The Virtual Network Call Processor 20A may then route the information (voice, or other type of data, such as image data, facsimile data, etc.) via the other Virtual Network Call Processors (20B–20D) and then to a destination facility 7 either directly from Virtual Network Call Processor 20D, or via the local telephone equipment 30B.

Because the respective hubs 20A–20D are digitally linked, via dedicated point to point connections or by the use of VPNs' (Virtual Private Networks) or through a gateway server over the Internet, no charges for long distance services are required, although the network of Virtual Network Call Processors 700 certainly could charge a fee for such services or other fee-based links may be used as well.

An example application of the network architecture of FIG. 8, might be if either an e-mail message, a facsimile message or other message such as a digitized voice, video or data file were intended to be left with a person in Florida (serviced at Virtual Network Call Processor 20A), a copy of that message may be routed through the network of hubs 20A–20D and to the destination facility 7. Since the connections are by way of dedicated links or VPNs, there are no long distance charges. In addition to the data relaying service, each of the respective Virtual Network Call Processors 20A–20D may also provide the standard call processing features described in FIGS. 4–5, for example.

The inventive system may include a CALL PULLBACK mechanism that employs a primary rate interface (PRI) that is compatible with National ISDN standards deployment of Simplified Message Desk Interface (SMDI).

The mechanisms and processes set forth in the present description may be implemented using one or more general purpose microprocessors programmed according to the teachings of the present specification, as will be appreciated to those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

Obviously, numerous modifications and variations of the present invention are possible in light of the above teachings. It is therefore to be understood that within the scope of the appended claims, the invention may be practiced otherwise than as specifically described herein.

APPENDIX

APPLICATION DELAY TABLE.INDEX DELAY (msec.)

| Index | Delay | Description |
|---|---|---|
| 0 | 0 | |
| 1 | 7000 | |
| 2 | 5000 | |
| 3 | 500 | |
| 4 | 5000 | |
| 5 | 1200 | |
| 6 | 1000 | |
| 7 | 30000 | |
| 8 | 800 | |
| 9 | 4000 | |
| 10 | 6000 | |
| 11 | 1000 | |
| 12 | 1000 | |
| 13 | 10000 | |
| 14 | 20000 | |
| 15 | 25000 | |
| 16 | 2000 | |
| 17 | 20 | |
| 18 | 1000 | |
| 19 | 200 | |
| 20 | 240 | |
| 21 | 100 | |
| 22 | 140 | |
| 23 | 200 | |
| 24 | 260 | |
| 25 | 300 | |
| 26 | 400 | |
| 27 | 260 | |
| 28 | 460 | |
| 29 | 800 | |
| 30 | 900 | |
| 31 | 1200 | |
| 32 | 1500 | |
| 33 | 2000 | |
| 34 | 2100 | |
| 35 | 2700 | |
| 36 | 3900 | |
| 37 | 4000 | |
| 38 | 6000 | |
| 39 | 1000 | |
| 40 | 4000 | |
| 41 | 10000 | |
| 42 | 1500 | |
| 43 | 1500 | |
| 44 | 2000 | |
| 45 | 500 | |
| 46 | 1700 | |
| 47 | 700 | |
| 48 | 500 | |
| 49 | 2500 | Maximum tone on period for any tone. When ringback, busy or fast busy is encountered this delay is used to determine whether the tone on is a valid tone. When an encountered tone on is longer then this delay it is assumed to be an answer. |
| 50 | 50 | |
| 51 | 4600 | Maximum tone off period for any tone. When ringback, busy or fast busy is encountered this delay is used to determine whether the tone off is of valid duration. When tone off is greater then this value it is assumed to be an answer. |
| 52 | 40 | |
| 53 | 2500 | Maximum tone on period. This is the longest tone on event that will be considered as ringback. This application delay is used to determine whether the tone on cadence event being monitored is ringback. If the tone on event is longer then this application delay it is assumed to not be ringback. |
| 54 | 800 | |
| 55 | 4600 | Ringback maximum tone off period. This is the longest tone off event that will be considered as ringback. If the tone off event being monitored is shorter then this application delay it is assumed to not be ringback. |
| 56 | 2000 | Ringback minimum tone off period. This is the shortest tone off event to qualify as ringback. This application delay is used to determine whether the tone cadence being monitored is ringback. If the tone cadence being monitored is less in duration then this value it is assumed to not be ringback |
| 57 | 2300 | |
| 58 | 20 | |
| 59 | 15000 | |
| 60 | 20 | |
| 61 | 500 | |
| 62 | 300 | |
| 63 | 500 | |
| 64 | 300 | |
| 65 | 3200 | |
| 66 | 2800 | |
| 67 | 280 | |
| 68 | 120 | |
| 69 | 600 | |
| 70 | 400 | |
| 71 | 600 | |
| 72 | 400 | |
| 73 | 320 | |
| 74 | 180 | |
| 75 | 320 | |
| 76 | 180 | |

I claim:

1. A virtual network call processing system, comprising:
 a communication line interface configured to be connected to a source terminal and receive a calling message from the source terminal directed to an intended recipient;
 a call processor with a call pullback mechanism including,
  a data processor, and
  a computer readable memory having computer readable instructions encoded therein that when executed by said data processor implement a central office switch characterization mechanism that characterizes signaling attributes of signals produced by one of a plurality of central office switches that service different geographical locations, said plurality of central office switches each having a different frequency and cadence signal event characteristic; and a signal determination mechanism configured to determine whether the signals produced by said one of said plurality central office switches includes at least one of a fast busy signal, slow busy signal, ringing signal, answered signal, and ring-no-answer signal, wherein said signal determination mechanism is not informed of the frequency or cadence of the signals before said signal event occurs.

2. The system according to claim 1, further comprising:

an error handling mechanism configured to process the calling message when the signal determination mechanism fails to accurately determine that the signal event occurred.

3. The system according to claim 1, wherein:

said signal determination mechanism includes a software tool programmed to recognize the at least one of the frequency and cadence associated with the signal event from signals associated with the central office switch.

4. The system of claim 1, wherein:

said computer readable memory includes
an intended recipient profile, having a first destination number and a second destination number, and said call pullback mechanism further includes a recipient contact mechanism being configured to attempt to first contact said intended recipient via an external line at the first destination number, and if not present, being configured to attempt to contact said intended recipient at the second destination number.

5. The system of claim 4, wherein:

said signal determination mechanism includes a tone detector being configured to detect when said calling message on said communication line is answered, or said signal event occurs; and said system further includes a call announcing mechanism configured to execute a whisper transfer to the called party that allows the called party to accept or reject the calling message.

6. The system of claim 5, wherein:

said tone detector being configured to notify the recipient contact mechanism when said communication line is not answered so said recipient contact mechanism proceeds to contact said intended recipient at said second destination number.

7. The system of claim 1, wherein:

said central office switch characterization mechanism includes a frequency characterization mechanism, configured to characterize a frequency of the signals produced by respective of said plurality of central office switches.

8. The system of claim 1, wherein:

said central office switch characterization mechanism includes a cadence analyzer configured to analyze a cadence of respective of the signals provided by respective of said plurality of central office switches.

9. The system of claim 8, wherein:

said central office switch characterization mechanism includes a frequency analyzer configured to analyze a frequency of the signals provided by respective of said plurality of central office switches.

10. The system of claim 1, further comprising:

a signal feature normalization mechanism, including an application delay adjustment mechanism configured to adjust respective application delays in said call processor so as to standardize signal attributes provided by respective of the plurality of central office switches.

11. The system of claim 10, further comprising:

another data processor and another computer readable memory configured to implement another central office switch characterization mechanism and another signal feature normalization mechanism, said processor and computer readable medium being connected to said another processor and said another computer readable medium by an intercity back-bone communication link.

12. A method for processing a call in a virtual network call processing system, comprising the steps of:

receiving a calling message from a source terminal directed to an intended recipient;

retrieving a data profile of the intended recipient from a computer readable medium;

identifying a number to contact the intended recipient via one of a plurality of central office switches, said plurality of central office switches each having a different frequency and cadence signal event characteristic;

characterizing signal attributes of signals produced by said one of said plurality of central office switches;

initiating the call on an external line with said number at said central office switch;

normalizing the signal from said one of said plurality of central office switches;

transferring the calling message if the call is accepted by the intended recipient, but retaining the calling message for future processing if the call is not accepted by the intended recipient.

13. The method of claim 12, further comprising the step of:

identifying another number in said data profile of said intended recipient;

calling on at least one of the external line and another external line, said another number at another central office switch of the plurality of central office switches;

normalizing a signal from the another central office switch;

transferring the calling message if accepted by the intended recipient at the another number, but retaining the calling message for further processing if not accepted.

14. The method of claim 13, further comprising the step of:

producing a tone on said external line and detecting when said external line is answered.

15. The method of claim 12, wherein:

said characterizing step comprises characterizing a frequency of the signal provided by the central office switch.

16. The method of claim 12, wherein:

said characterizing step comprises characterizing a cadence of the signal provided by the central office switch.

17. The method of claim 16, wherein:

said characterizing step further comprises characterizing a frequency of the signal provided by the central office switch.

18. The method of claim 12, wherein:

said normalizing step comprises adjusting respective application delays so as to standardize signal attributes of the signal from the central office switch.

19. The method of claim 12, wherein:

said calling step comprises passing the calling message from a first hub to a second hub, prior to reaching the central office switch.

20. A computer readable medium encoded with a computer readable instructions for use in a system having a communication line interface configured to be connected to a source terminal and configured to receive a calling message from the source terminal directed to an intended recipient, said computer readable instructions when executed by a data processor implement a system comprising:

a central office switch characterization mechanism that characterizes signaling attributes of signals produced by a plurality of central office switches that each have different frequency and cadence signal event characteristics and that service different geographical locations at which the intended recipient is located;

a signal determination mechanism configured to determine whether the signals produced by one of the plurality of central office switches includes at least one of a fast busy signal, slow busy signal, ringing signal, answered signal, and ring-no-answer signal; and a call pullback mechanism configured to call an intended recipient and transfer a calling message to said intended recipient if said signal determination mechanism determines said call is answered, but not transferring said calling message if said signal determination mechanism determines that said call is not answered.

21. A virtual network call processing system, comprising:

means for receiving a calling message from a source terminal directed to an intended recipient;

means for identifying a number to contact the intended recipient via one of a plurality of central office switches, each of the plurality of central office switches having a different frequency and cadence signal event characteristic;

means for characterizing signal attributes of signals produced by said one of said plurality of central office switches;

means for initiating a call on an external line with said number at said one of said plurality of central office switches;

means for normalizing the signal from said one of said plurality of central office switches; and means for transferring the calling message if the call is accepted by the intended recipient, but retaining the calling message for future processing if the call is not accepted by the intended recipient.

* * * * *